US011783844B2

(12) United States Patent
Lim et al.

(10) Patent No.: US 11,783,844 B2
(45) Date of Patent: Oct. 10, 2023

(54) METHODS OF ENCODING AND DECODING AUDIO SIGNAL USING SIDE INFORMATION, AND ENCODER AND DECODER FOR PERFORMING THE METHODS

(71) Applicants: ELECTRONICS AND TELECOMMUNICATIONS RESEARCH INSTITUTE, Daejeon (KR); Gwangju Institute of Science and Technology, Gwangju (KR)

(72) Inventors: Woo-taek Lim, Sejong-si (KR); Seung Kwon Beack, Daejeon (KR); Jongmo Sung, Daejeon (KR); Tae Jin Lee, Daejeon (KR); Inseon Jang, Daejeon (KR); Jong Won Shin, Gwangju (KR); Soojoong Hwang, Gwangju (KR); Youngju Cheon, Gwangju (KR); Sangwook Han, Gwangju (KR)

(73) Assignees: ELECTRONICS AND TELECOMMUNICATIONS RESEARCH INSTITUTE, Daejeon (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 29 days.

(21) Appl. No.: 17/527,351

(22) Filed: Nov. 16, 2021

(65) Prior Publication Data
US 2022/0358940 A1   Nov. 10, 2022

(30) Foreign Application Priority Data

May 7, 2021   (KR) ........................ 10-2021-0059312

(51) Int. Cl.
*G10L 17/02* (2013.01)
*G10L 21/00* (2013.01)
(Continued)

(52) U.S. Cl.
CPC .............. *G10L 19/02* (2013.01); *G06N 3/045* (2023.01); *G10L 25/21* (2013.01); *G10L 25/30* (2013.01)

(58) Field of Classification Search
CPC .......... G10L 17/02; G10L 21/00; G10L 19/00
See application file for complete search history.

(56) References Cited

U.S. PATENT DOCUMENTS 10,186,274 B2   1/2019   Nagel et al.
10,652,685 B2   5/2020   Beack et al.
(Continued)

FOREIGN PATENT DOCUMENTS

| BR | 112021007807 A2 * | 7/2021 | ........... G10L 19/008 |
|----|-------------------|--------|------------------------|
| CN | 107636756 A * | 1/2018 | ........... G10L 19/008 |

(Continued)

OTHER PUBLICATIONS

Ho-Jin Cho et al., "Audio High-Band Coding based on Autoencoder with Side Information", JBE vol. 24, No. 3, May 2019.
(Continued)

*Primary Examiner* — Shreyans A Patel
(74) *Attorney, Agent, or Firm* — LRK PATENT LAW FIRM

(57) ABSTRACT

Disclosed are methods of encoding and decoding an audio signal using side information, and an encoder and a decoder for performing the methods. The method of encoding an audio signal using side information includes identifying an input signal, the input signal being an original audio signal, extracting side information from the input signal using a learning model trained to extract side information from a
(Continued)

feature vector of the input signal, encoding the input signal, and generating a bitstream by combining the encoded input signal and the side information.

6 Claims, 6 Drawing Sheets

(51) Int. Cl.
  *G10L 19/00* (2013.01)
  *G10L 19/02* (2013.01)
  *G10L 25/30* (2013.01)
  *G10L 25/21* (2013.01)
  *G06N 3/045* (2023.01)

(56) References Cited

U.S. PATENT DOCUMENTS

| | | | |
|---|---|---|---|
| 11,562,764 B2* | 1/2023 | Schmidt | G10L 21/038 |
| 2011/0051935 A1* | 3/2011 | Moon | H04S 1/007 381/1 |
| 2016/0344902 A1* | 11/2016 | Kim | G11B 27/10 |
| 2022/0358940 A1* | 11/2022 | Lim | G06N 3/045 |
| 2022/0399025 A1* | 12/2022 | Chae | G10L 17/02 |

FOREIGN PATENT DOCUMENTS

| | | | | |
|---|---|---|---|---|
| EP | 3147899 B1 | 11/2018 | | |
| JP | 2019066868 A | * | 4/2019 | .......... G10L 19/005 |
| TW | I720530 B | * | 7/2019 | |
| WO | WO-2008046967 A1 | * | 4/2008 | .......... G10L 19/008 |
| WO | 2015-108358 A1 | | 7/2015 | |

OTHER PUBLICATIONS

Florin Ghido et al., "Coding of fine granular audio signals using high resolution envelope processing (hrep)", IEEE International Conference on Acoustics, Speech and Signal Processing (ICASSP), 2017, pp. 701-705.

Arijit Biswas et al., "Audio Codec Enhancement With Generative Adversarial Networks", ICASSP 2020—2020 IEEE International Conference on Acoustics, Speech and Signal Processing (ICASSP) (2020): 356-360.

Ziyue Zhao et al., "Convolutional Neural Networks to Enhance Coded Speech", IEEE/ACM Transactions on Audio, Speech, and Language Processing, vol. 27, No. 4, pp. 663-678, Apr. 2019.

* cited by examiner

METHODS OF ENCODING AND DECODING AUDIO SIGNAL USING SIDE INFORMATION, AND ENCODER AND DECODER FOR PERFORMING THE METHODS

CROSS-REFERENCE TO RELATED APPLICATION

This application claims the benefit of Korean Patent Application No. 10-2021-0059312 filed on May 7, 2021, in the Korean Intellectual Property Office, the entire disclosure of which is incorporated herein by reference for all purposes.

BACKGROUND

1. Field of the Invention

One or more example embodiments relate to methods of encoding and decoding an audio signal using side information, and an encoder and decoder for performing the methods.

2. Description of Related Art

Audio signal encoding and decoding technologies have been developed through MP3, Advanced Audio Coding (AAC), and Unified Speech and Audio Coding (USAC). To increase compression and restoration rates, research on encoding and decoding technologies is continuously carried out.

Encoding at a high bit rate may reduce the loss of audio quality of a decoded audio signal. However, encoding at a low bit rate may degrade the audio quality of a restored audio signal due to causes such as quantization noise, pre-echo, and bandwidth limitation. Accordingly, there is a demand for encoding and decoding technology that may support a high quality even at a low bit rate.

SUMMARY

Example embodiments provide a method and apparatus that may encode and decode an audio signal using side information, thereby enhancing an audio quality of a decoded audio signal even at a low bit rate.

According to an aspect, there is provided a method of encoding an audio signal using side information, the method including identifying an input signal, the input signal being an original audio signal, extracting side information from the input signal using a learning model trained to extract side information from a feature vector of the input signal, encoding the input signal, and generating a bitstream by combining the encoded input signal and the side information.

The side information may include information on energy of a low-band signal with a frequency less than or equal to a criterion, in the input signal.

The learning model may be a convolutional neural network model configured to output the side information from the feature vector of the input signal.

The extracting may include generating a feature vector from the input signal and obtaining the side information by applying the learning model to the feature vector.

According to an aspect, there is provided a method of decoding an audio signal using side information, the method including identifying a bitstream generated by an encoder, extracting an encoded input signal and side information from the bitstream, decoding the encoded input signal, and generating an output signal from the side information and the decoded input signal using a learning model trained to generate an output signal from the side information and the decoded input signal.

The side information may include information on energy of a low-band signal with a frequency less than or equal to a criterion, in the input signal.

According to an aspect, there is provided a method of training learning models used to encode and decode an audio signal, the method including identifying an input signal and a feature vector of the input signal, extracting side information from the input signal using a first learning model trained to extract side information from the feature vector of the input signal, encoding the input signal, generating a bitstream by combining the encoded input signal and the side information, extracting the encoded input signal and the side information from the bitstream, decoding the encoded input signal, generating an output signal from the side information and the decoded input signal using a second learning model trained to generate an output signal from the side information and the decoded input signal, extracting a feature vector from the output signal, and training the first learning model and the second learning model by comparing the feature vector of the input signal and the feature vector of the output signal.

The side information may include information on energy of a low-band signal with a frequency less than or equal to a criterion, in the input signal.

The first learning model may be a convolutional neural network model configured to output the side information from the feature vector of the input signal.

According to an aspect, there is provided an encoder for performing a method of encoding an audio signal, the encoder including a processor, wherein the processor may be configured to identify an input signal, the input signal being an original audio signal, extract side information from the input signal using a learning model trained to extract side information from a feature vector of the input signal, encode the input signal, and generate a bitstream by combining the encoded input signal and the side information.

The side information may include information on energy of a low-band signal with a frequency less than or equal to a criterion, in the input signal.

The learning model may be a convolutional neural network model configured to output the side information from the feature vector of the input signal.

The processor may be further configured to generate a feature vector from the input signal and obtain the side information by applying the learning model to the feature vector.

According to an aspect, there is provided a decoder for performing a method of decoding an audio signal, the decoder including a processor, wherein the processor may be configured to identify a bitstream generated by an encoder, extract an encoded input signal and side information from the bitstream, decode the encoded input signal, and generate an output signal from the side information and the decoded input signal using a learning model trained to generate an output signal from the side information and the decoded input signal.

The side information may include information on energy of a low-band signal with a frequency less than or equal to a criterion, in the input signal.

Additional aspects of example embodiments will be set forth in part in the description which follows and, in part, will be apparent from the description, or may be learned by practice of the disclosure.

According to example embodiments, it is possible to encode and decode an audio signal using side information, thereby enhancing an audio quality of a decoded audio signal.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
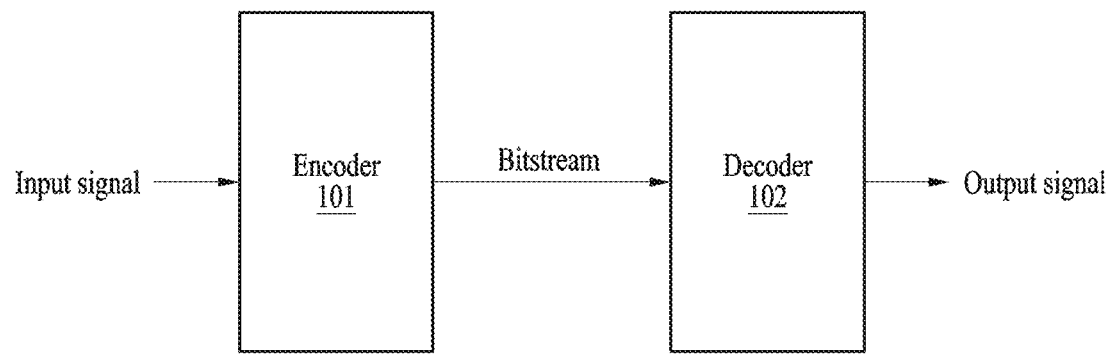
FIG. 1 illustrates an encoder and a decoder according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 illustrates an encoder and a decoder according to an example embodiment.

The present disclosure provides techniques for increasing an audio quality of an audio signal using side information in encoding and decoding the audio signal.

Referring to FIG. 1, an encoder 101 may generate a bitstream from an input signal, and a decoder 102 may generate an output signal from the bitstream.

The encoder 101 and the decoder 102 may each include a processor, and the processors included in the encoder 101 and the decoder 102 may perform an encoding method and a decoding method provided herein. The encoder 101 and the decoder 102 may be the same electronic device. The input signal may be an original audio signal to be encoded and decoded, and the output signal may be an audio signal restored from the input signal.

The encoder 101 may extract side information from the input signal using a first learning model. The first learning model may be trained to extract side information from a feature vector of an input signal. The decoder 102 may generate the output signal from the side information and a decoded input signal using a second learning model. The second learning model may be trained to generate an output signal from side information and a decoded input signal.

The encoder 101 or the decoder 102 may perform methods of training the first learning model and the second learning model used for encoding and decoding the audio signal. The first learning model and the second learning model may be deep learning-based neural network models.

The first learning model and the second learning model may generate output data for input data, and may each include an input layer, hidden layers, and an output layer, wherein each layer may include a plurality of parameters.

Neural network models such as convolutional neural networks or recurrent neural network-based autoencoders may be used as the first learning model and the second learning model, and the types of the first learning model and the second learning model are not limited to specific examples. Various types of neural network models may be used.

For example, the first learning model may include convolutional neural networks having architectures as shown in Table 1 below.

TABLE 1

| No | (inChannel, outChannel) | Kernel size | Activation function |
|---|---|---|---|
| 1 | (1, 64) | (1 × 257) | PReLU |
| 2 | (64, 16) | (3 × 1) | PReLU |
| 3 | (16, k) | (n × 1) | Sigmoid |

Referring to Table 1, the first learning model may include i) a convolutional neural network model with 1 input channel, 64 output channels, a 1×257 kernel, and parametric rectified linear unit (PReLU) as an activation function. Alternatively, the first learning model may include i) a convolutional neural network model with 64 input channels, 16 output channels, a 3×1 kernel, and PReLU as an activation function.

The side information may refer to information on a feature of the input signal. The decoder 102 may generate a high-quality output signal by restoring the input signal using the side information.

The side information may be generated by an operation performed on the input signal at the hidden layers of the first learning model. The first learning model may be trained to increase the quality of the audio signal restored by the decoder 102, and the parameters of the hidden layers may be updated. The side information may be data in which the dimensions of the input signal are reduced.

As an example, the side information may include a scalar value determined for each frame of the input signal. Each graph of FIG. 5B may represent a scalar value per frame of side information. Accordingly, the side information may be changed by training of the hidden layers in a learning process. As an example, the side information extracted with respect to the input signal by the trained first learning model may be data for modeling total energy of the input signal, energy of a low-band signal with a frequency less than or equal to a criterion in the input signal, or a loss function.

That is, the side information may include information about the total energy of the input signal, information about the energy of the low-band signal with the frequency less than or equal to the criterion in the input signal, or information about the loss function.

Figure 2:
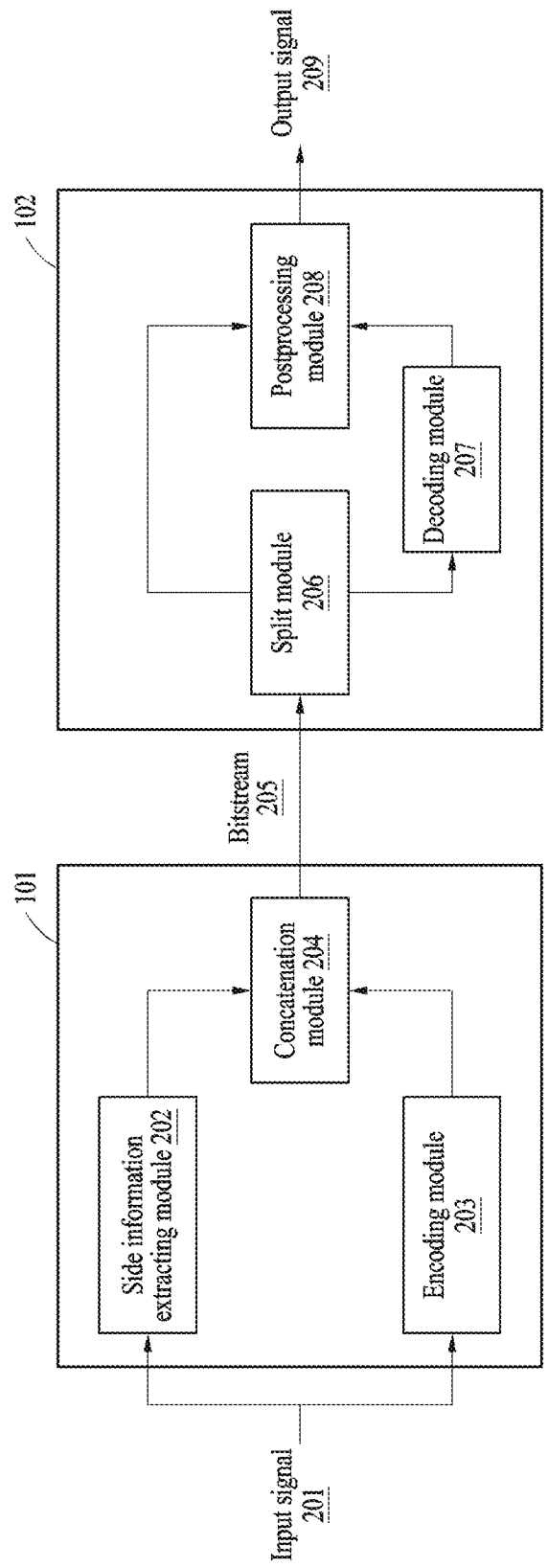
FIG. 2 illustrates elements included in an encoder and a decoder according to an example embodiment.

FIG. 2 illustrates elements included in an encoder and a decoder according to an example embodiment.

The encoder 101 may include a side information extracting module 202, an encoding module 203, and a concatenation module 204. Operations processed by the modules included in the encoder 101 may be performed by the processor included in the encoder 101. The decoder 102 may include a split module 206, a decoding module 207, and a postprocessing module 208. Operations processed by the modules included in the decoder 102 may be performed by the processor included in the decoder 102.

The encoder 101 may identify an input signal 201. The identified input signal 201 may be input to the side information extracting module 202 and the encoding module 203. The side information extracting module 202 may generate side information based on the input signal 201. The side information extracting module 202 may extract the side information from the input signal 201 using a first learning model trained to extract side information from a feature vector of the input signal 201.

Specifically, the side information extracting module 202 may extract the feature vector from the input signal 201. The feature vector may be a vector representing feature information of the input signal 201. The type of the feature vector is not limited to a specific example. As an example, the feature vector may be a log power spectrum of the input signal 201.

The side information extracting module 202 may generate the side information of the input signal 201 by inputting the feature vector to the first learning model. As an example, the side information extracting module 202 may use a feature vector for a current frame and a feature vector for a previous frame as input data of the first learning model.

The encoding module 203 may encode the input signal 201. The input signal 201 may be encoded using various methods available to those skilled in the art. As an example, Advanced Audio Coding (AAC), Adaptive Multi-Rate (AMR), Enhanced Voice Service (EVS), Unified Speech and Audio Coding (USAC), and neural network models available to those skilled in the art may be used to encode the input signal. The encoding module 203 may quantize the encoded input signal 201.

As an example, when the form of an output of the first learning model is a single floating point, the encoding module 203 may perform scalar quantization on the encoded input signal 201. As another example, when the form of the output of the first learning model is a vector having k elements, the encoding module 203 may perform vector quantization on the encoded input signal 201. k may be an arbitrary natural number.

The concatenation module 204 may generate a bitstream 205 corresponding to the side information and the encoded input signal 201. The concatenation module 204 may convert the side information and the encoded input signal 201 into the bitstream 205. The concatenation module 204 may combine the side information and the encoded input signal 201 and convert the combination into the bitstream 205.

The split module 206 may identify the bitstream 205 and extract the encoded input signal 201 and the side information from the bitstream 205. The decoding module 207 may decode the encoded input signal 201. The encoded input signal 201 may be decoded using various types of decoding methods depending on the encoding method. The postprocessing module 208 may generate an output signal 209 from the decoded input signal and the side information generated from the bitstream 205.

The postprocessing module 208 may generate the output signal 209 by inputting the side information and the decoded input signal to a second learning model trained to generate the output signal 209 from the side information and the decoded input signal. As an example, the second learning model may include hidden layers for generating an output signal. As an example, the output signal may be generated by an operation on the side information and the decoded input signal at the hidden layers of the second learning model. That is, the postprocessing module 208 may generate the output signal 209 by performing an operation on parameters of the hidden layers of the second learning model, the side information, and the decoded input signal.

The first learning model and the second learning model may be trained to minimize a difference between the generated output signal 209 and the original input signal 201.

The encoder 101 or the decoder 102 may train the first learning model and the second learning model by comparing a feature vector of the input signal 201 and a feature vector of the output signal 209. Specifically, the encoder 101 or the decoder 102 may train the learning models by updating the parameters included in the learning models to reduce a difference between the feature vector of the input signal 201 and the feature vector of the output signal 209.

As an example, the encoder 101 or the decoder 102 may determine a loss function based on the difference between the feature vector of the input signal 201 and the feature vector of the output signal 209, and update the parameters included in the learning models to minimize a mean squared error. As an example, various types of loss functions such as mean squared error (MSE) may be used as the loss function.

FIGS. 3A to 3F are graphs illustrating test results according to an example embodiment.

The graphs of FIGS. 3A to 3F represent audio quality evaluation results of MPEG-4 High-Efficiency Advanced Audio Coding (HE-AAC) implemented at various bit rates. In the graphs of FIGS. 3A to 3F, a vertical axis may indicate a Perceptual Evaluation of Speech Quality (PESQ) score, where PESQ is an evaluation of the speech quality standardized as ITU-T Recommendation P.862.2, and a horizontal axis may indicate a bit rate to be tested.

Figures 3A, 3B, 3C, 3D, 3E, 3F:
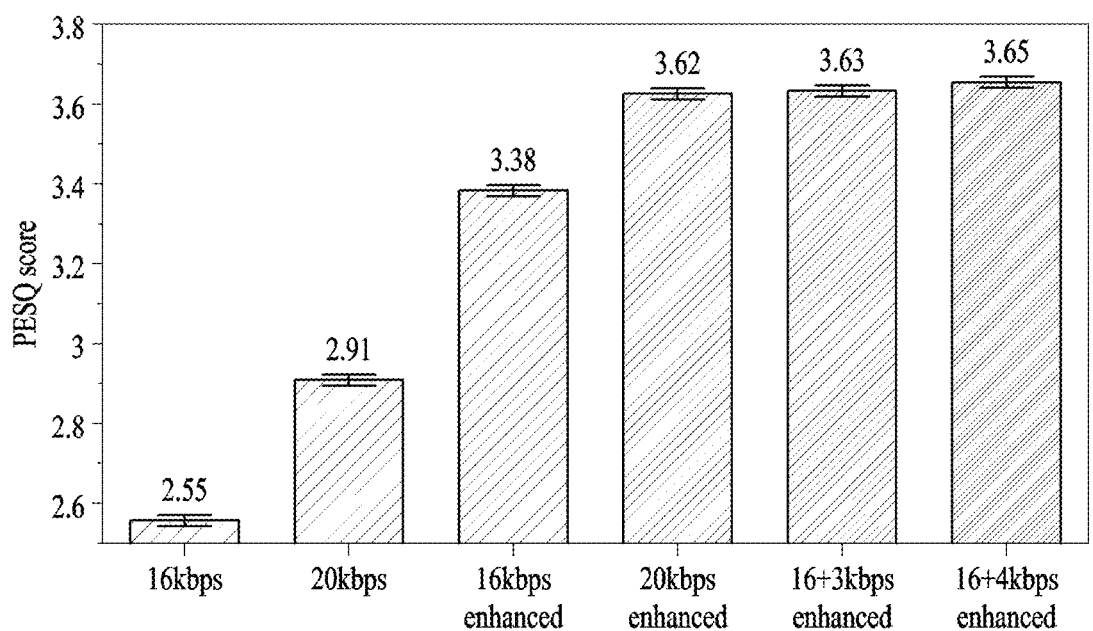
FIGS. 3A to 3F are graphs illustrating test results according to an example embodiment.

FIG. 3A shows a result of an evaluation of the audio quality of HE-AAC in which a bit rate is 16 kilobits per second (kbps) and a separate audio quality enhancement technique is not implemented. FIG. 3B shows a result of an evaluation of the audio quality of HE-AAC in which a bit rate is 20 kbps and a separate audio quality enhancement technique is not implemented.

FIG. 3C shows a result of an evaluation of the audio quality of HE-AAC in which a bit rate is 16 kbps and an audio quality enhancement technique according to an existing method is implemented without using side information. FIG. 3D shows a result of an evaluation of the audio quality of HE-AAC in which a bit rate is 20 kbps and an audio quality enhancement technique according to an existing method is implemented without using side information.

FIG. 3E shows a result of an evaluation of the audio quality of HE-AAC in which a bit rate is 16 kbps and the audio quality is enhanced by allocating side information to an additional bit rate of 3 kbps according to an example embodiment. FIG. 3F shows a result of an evaluation of the audio quality of HE-AAC in which a bit rate is 16 kbps and the audio quality is enhanced by allocating side information to an additional bit rate of 4 kbps according to an example embodiment.

Referring to FIGS. 3A to 3F, the quality of an audio signal restored using an additional bit rate (e.g., FIG. 3E) may be higher than the quality of an audio signal restored without using additional information (e.g., FIG. 3A or 3C). In addition, the quality of an audio signal restored using an additional bit rate (e.g., FIG. 3F) may be higher than the quality of an audio signal restored at the same bit rate without using additional information (e.g., FIG. 3B or 3D).

Table 2 below shows test results using Nero AAC Codec.

TABLE 2

| Bitrate | 16 kbps | 17 kbps | 19 kbps |
| --- | --- | --- | --- |
| Decoded | 2.34 | 2.40 | 2.49 |
| Post-proc. without side info. | 3.16 | 3.26 | 3.32 |
| 16 + 1 kbps | — | 3.36 | — |
| 16 + 3 kbps | — | — | 3.56 |

Table 2 may represent PESQ scores according to bit rates. Rows 4 and 5 may represent PESQ scores when a bit rate of 1 kbps and a bit rate of 3 kbps are respectively allocated to side information according to an example embodiment. Row 2 may represent a PESQ score of Nero AAC in which a separate audio quality enhancement scheme is not implemented, and Row 3 may represent a PESQ score of Nero AAC in which an audio quality enhancement scheme according to an existing method is implemented without using side information.

Figures 4A, 4B, 4C:
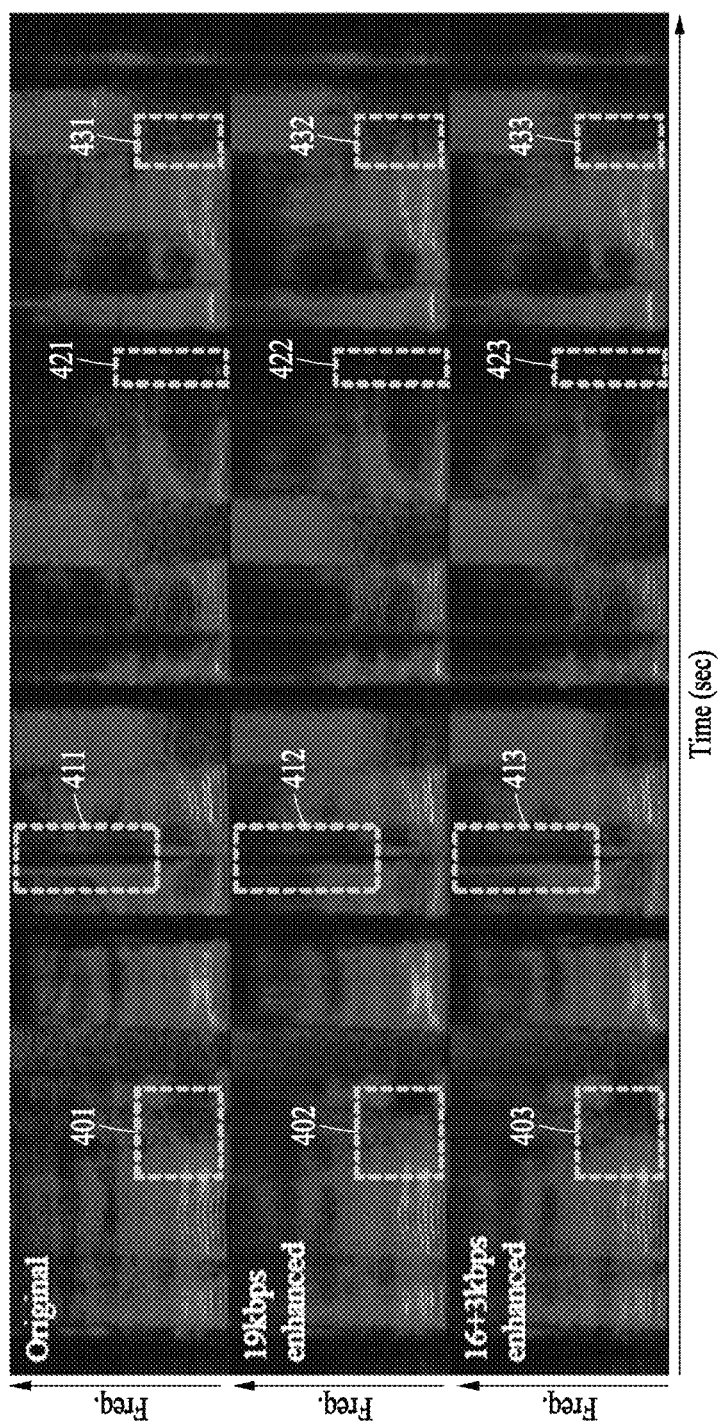
FIGS. 4A to 4C illustrate spectrograms of an original audio signal and restored audio signals according to an example embodiment.

FIGS. 4A to 4C illustrate spectrograms of an original audio signal and restored audio signals according to an example embodiment.

FIG. 4A shows a spectrogram of an original audio signal. FIG. 4B shows a spectrogram of an audio signal restored by an existing audio quality enhancement scheme at a bit rate of 19 kbps without using side information.

FIG. 4C shows a spectrogram of an audio signal restored using side information allocated at a bit rate of 3 kbps according to an example embodiment. In each spectrogram, a vertical axis may represent a frequency, and a horizontal axis may represent a time.

Referring to FIGS. 4A to 4C, for predetermined regions 401, 411, and 421 of the original audio signal, spectrograms 403, 413, and 423 restored according to an example embodiment may be more similar to the original audio signal than spectrograms 402, 412, and 422 of the audio signal restored by the conventional method are.

Figure 5A:
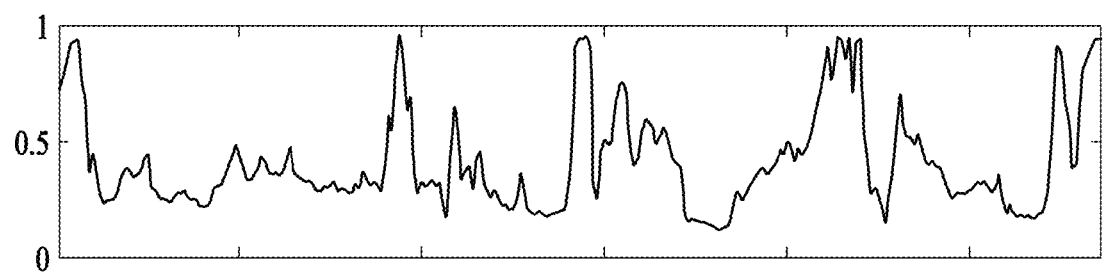
FIGS. 5A to 5C illustrate side information and a spectrogram of an original audio signal according to an example embodiment.
Figure 5B:
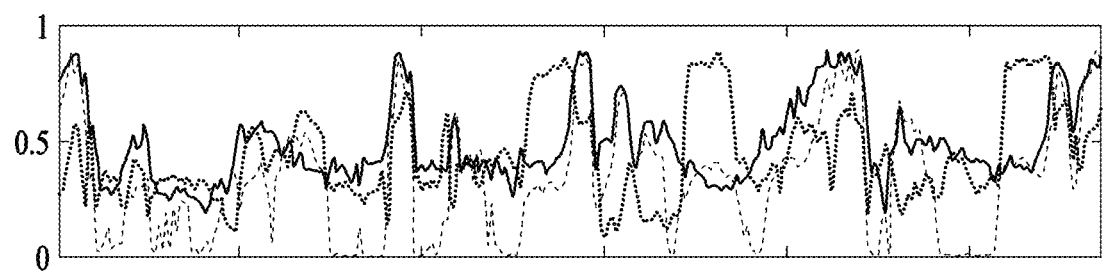
Figure 5C:
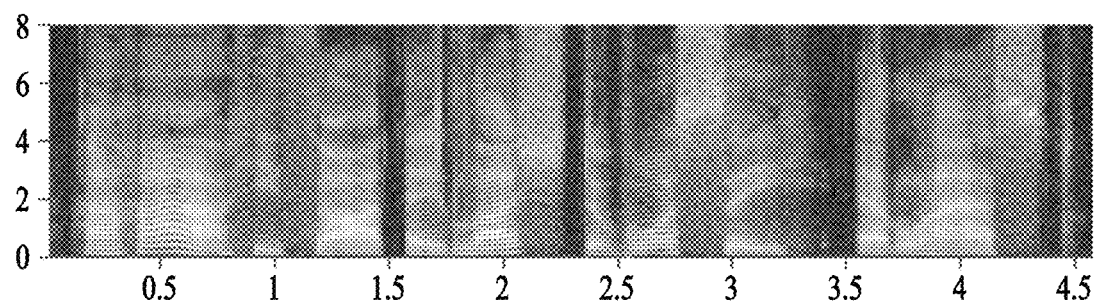

FIGS. 5A to 5C illustrate side information and a spectrogram of an original audio signal according to an example embodiment.

In each graph of FIGS. 5A to 5C, an x-axis may represent a time (frame), and a y-axis may represent side information. As an example, the side information may be data expressed as a scalar value per frame of an input signal. FIG. 5A is a graph showing side information for one-dimensional side information. FIG. 5B is a graph showing side information for three-dimensional side information. FIG. 5C is a graph showing a spectrogram of an original audio signal.

As an example, the side information shown in FIG. 5A may exhibit a tendency to be inversely proportional to a value of energy of the input signal. As an example, the side information shown in FIG. 5A may model a level of the energy of the input signal.

In FIG. 5B, side information 501 may model a level of energy of an input signal as in FIG. 5A. In FIG. 5B, side information 502 may model energy of the input signal in a low frequency band. In FIG. 5B, side information 503 may model energy of the input signal in a low frequency band.

As an example, the side information 503 may indicate a change in the time of side information required to minimize a difference between an input signal and an output signal. As an example, the side information 503 may have a smaller value for a louder sound and a greater value for a silent period. As an example, the side information 503 may be in inverse proportion to the volume of a sound. Therefore, the smaller the energy of the input signal, the smaller the signal-to-noise ratio (SNR) and the more sensitive to quantization noise. Thus, the side information 503 may include information to enhance the quality of a restored audio signal when the energy of an input signal is small.

Figures 6A, 6B:
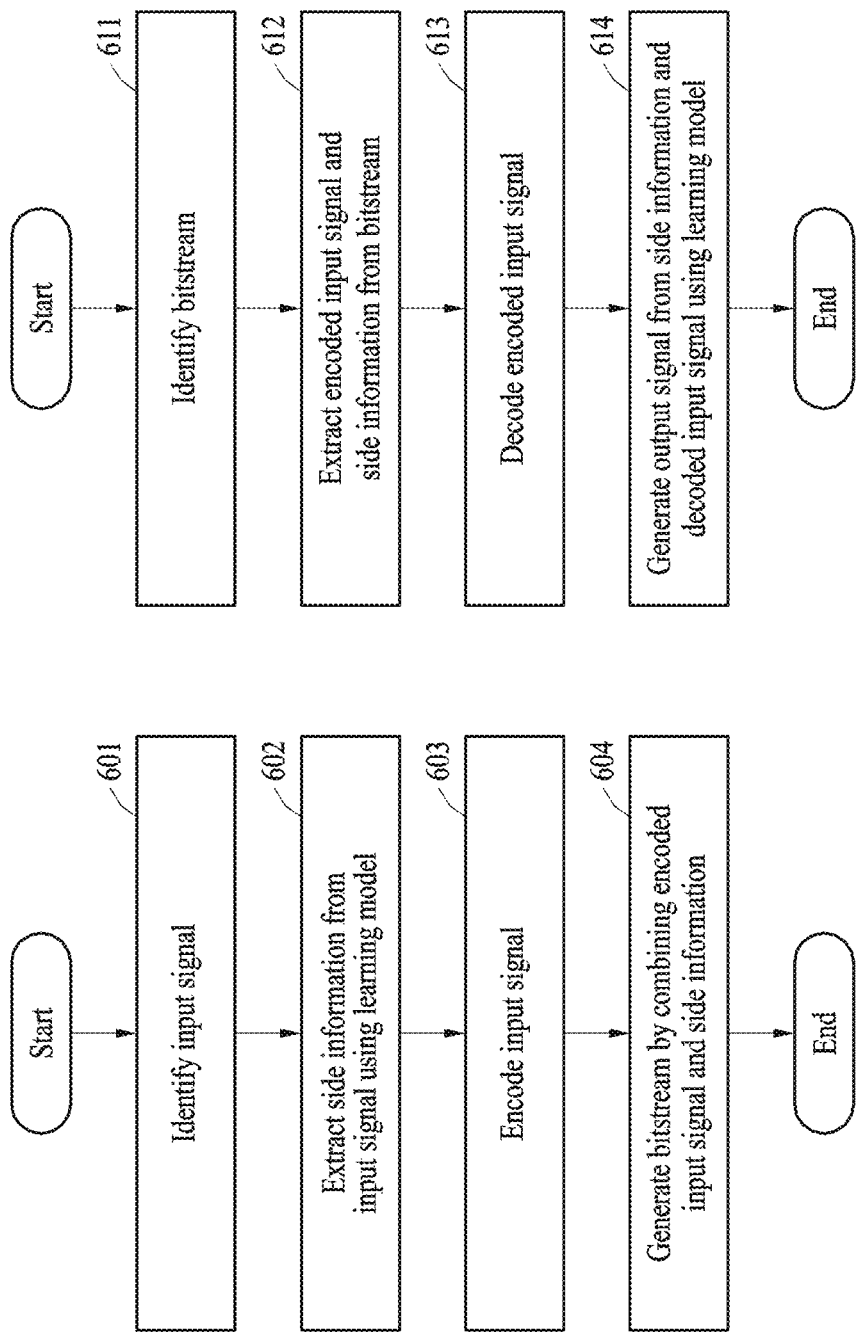
FIGS. 6A and 6B are flowcharts illustrating encoding and decoding methods according to an example embodiment.

FIGS. 6A and 6B are flowcharts illustrating encoding and decoding methods according to an example embodiment.

In operation 601, an encoder may identify an input signal. The input signal may be an original audio signal. In operation 602, the encoder may extract side information from the input signal using a first learning model. The first learning model may be trained to extract side information from a feature vector of an input signal. Separate bits may be allocated to store the side information.

In operation 603, the encoder may encode the input signal. A separate autoencoder-based neural network model may be used for encoding the input signal. The encoder may encode and quantize the input signal using an autoencoder. As another example, the encoder may encode the input signal using linear predictive coding.

In operation 604, the encoder may generate a bitstream by combining the encoded input signal and the side information. The bitstream may be transmitted to a decoder. In operation 611, the decoder may identify the bitstream.

In operation 612, the decoder may extract the encoded input signal and the side information from the bitstream. In operation 613, the decoder may decode the encoded input signal. The decoding method may be determined according to the method used for encoding.

In operation 614, the decoder may generate an output signal from the side information and the decoded input signal using a second learning model. The second learning model may be trained to generate an output signal from side information and a decoded input signal. Data input to the second learning model may be the decoded input signal and the side information, and data output from the second learning model may be the output signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a sub-routine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual to example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of encoding an audio signal using side information, the method comprising:
   identifying an input signal, the input signal being an original audio signal;
   extracting side information from the input signal using a learning model trained to extract side information from a feature vector of the input signal;
   encoding the input signal; and
   generating a bitstream by combining the encoded input signal and the side information,
   wherein the side information comprises information on energy of a low-band signal with a frequency less than or equal to a criterion, in the input signal.

2. The method of claim 1, wherein the learning model is a convolutional neural network model configured to output the side information from the feature vector of the input signal.

3. The method of claim 1, wherein the extracting comprises generating a feature vector from the input signal and obtaining the side information by applying the learning model to the feature vector.

4. A method of decoding an audio signal using side information, the method comprising:
   identifying a bitstream generated by an encoder;
   extracting an encoded input signal and side information from the bitstream;
   decoding the encoded input signal; and
   generating an output signal from the side information and the decoded input signal using a learning model trained to generate an output signal from the side information and the decoded input signal,
   wherein the side information comprises information on energy of a low-band signal with a frequency less than or equal to a criterion, in the input signal.

5. A method of training learning models used to encode and decode an audio signal, the method comprising:

identifying an input signal and a feature vector of the input signal;

extracting side information from the input signal using a first learning model trained to extract side information from the feature vector of the input signal;

encoding the input signal;

generating a bitstream by combining the encoded input signal and the side information;

extracting the encoded input signal and the side information from the bitstream;

decoding the encoded input signal;

generating an output signal from the side information and the decoded input signal using a second learning model trained to generate an output signal from the side information and the decoded input signal;

extracting a feature vector from the output signal; and training the first learning model and the second learning model by comparing the feature vector of the input signal and the feature vector of the output signal, wherein the side information comprises information on energy of a low-band signal with a frequency less than or equal to a criterion, in the input signal.

6. The method of claim 5, wherein the first learning model is a convolutional neural network model configured to output the side information from the feature vector of the input signal.

* * * * *